United States Patent
Kim et al.

(10) Patent No.: US 9,836,170 B2
(45) Date of Patent: Dec. 5, 2017

(54) TOUCH SCREEN PANEL INCLUDING MESH PATTERN AND MANUFACTURING METHOD THEREOF

(71) Applicant: Samsung Display Co., Ltd., Yongin-si (KR)

(72) Inventors: Yeon-Tae Kim, Yongin (KR);
Young-Soo No, Yongin (KR);
Hwan-Hee Jeong, Yongin (KR);
In-Young Han, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 133 days.

(21) Appl. No.: 14/857,042

(22) Filed: Sep. 17, 2015

(65) Prior Publication Data

US 2016/0209971 A1    Jul. 21, 2016

(30) Foreign Application Priority Data

Jan. 16, 2015    (KR) .................. 10-2015-0008005

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01); *G06F 2203/04111* (2013.01); *G06F 2203/04112* (2013.01)

(58) Field of Classification Search
CPC ........... G06F 3/044; G06F 2203/04111; G06F 2203/04103
See application file for complete search history.

(56) References Cited

U.S. PATENT DOCUMENTS

| | | | | |
|---|---|---|---|---|
| 2012/0044191 A1* | 2/2012 | Shin | ............... | G06F 3/044 345/174 |
| 2012/0062510 A1* | 3/2012 | Mo | ............... | G06F 3/044 345/174 |
| 2013/0169548 A1 | 7/2013 | Kim et al. | | |
| 2013/0314625 A1* | 11/2013 | Tsai | ............... | G06F 3/044 349/12 |
| 2014/0111709 A1* | 4/2014 | Kim | ............... | G02F 1/13338 349/12 |

(Continued)

FOREIGN PATENT DOCUMENTS

| KR | 10-2013-0061854 | 6/2013 |
|---|---|---|
| KR | 10-2013-0078065 | 7/2013 |

(Continued)

*Primary Examiner* — Jonathan Blancha
(74) *Attorney, Agent, or Firm* — H.C. Park & Associates, PLC

(57) ABSTRACT

A touch screen panel includes a substrate including an active area and a non-active area disposed at an external side of the active area, first sensing electrodes disposed in the active area, the first sensing electrodes connected to each other and extending in a first direction, first connection patterns connecting adjacent first sensing electrodes, second sensing electrodes connected to each other and extending in a second direction crossing the first direction, second connection patterns connecting adjacent second sensing electrodes, and metal mesh patterns overlapping first portions of the first or second sensing electrodes.

19 Claims, 5 Drawing Sheets

(56) References Cited

U.S. PATENT DOCUMENTS

| 2014/0152579 A1* | 6/2014 | Frey | G06F 3/044 |
| | | | 345/173 |
| 2014/0160372 A1* | 6/2014 | Li | G06F 3/044 |
| | | | 349/12 |
| 2015/0060817 A1* | 3/2015 | Sato | H01L 27/323 |
| | | | 257/40 |

FOREIGN PATENT DOCUMENTS

| KR | 10-2014-0017009 | 2/2014 |
| KR | 10-2014-0030900 | 3/2014 |

\* cited by examiner

TOUCH SCREEN PANEL INCLUDING MESH PATTERN AND MANUFACTURING METHOD THEREOF

CROSS-REFERENCE TO RELATED APPLICATION

This application claims priority from and the benefit of Korean Patent Application No. 10-2015-0008005, filed on Jan. 16, 2015, which is hereby incorporated by reference for all purposes as if fully set forth herein.

BACKGROUND

Field

Exemplary embodiments of the present invention relate to a touch screen panel, and a manufacturing method thereof, and particularly, to a touch screen panel including a metal mesh pattern in a partial area of a sensing electrode of the touch screen panel, and a manufacturing method thereof.

Discussion of the Background

A touch screen panel may be an input device where a user inputs a command by selecting contents displayed on a screen of an image display device and the like by using a hand or an object. The touch screen panel may be provided on a front surface of the image display device, and converts a contact position with which the hand or the object is in contact into an electrical signal. Accordingly, indication contents selected at the contact position may be received as an input signal.

The touch screen panel may replace a separate input device, such as a keyboard or a mouse that may operate while being connected to an image display device, and a range of usage of the touch screen panel has been increased. A method of implementing the touch screen panel includes a resistive method, a light detection method, and a capacitive method. In the capacitive touch screen panel, when a hand of a person or an object touches the touch screen panel, a conductive sensing electrode detects a change in capacitance formed with another surrounding sensing electrode, a ground electrode, or the like to convert a contact position into an electric signal. The capacitive touch screen panel may provide an improved image quality, as compared to the resistive touch screen panel that may deteriorate an image quality due to an air layer existing between two transparent substrates on which an upper electrode and a lower electrode are formed, respectively.

Sensing electrodes included in the capacitive touch screen panel may be conductive to allow electricity to flow therethrough, and a transparent characteristic so that a screen of a display at a lower side may be viewed. Accordingly, indium tin oxide (ITO) may be used as a material of the sensing electrodes. As a size of the display panel increases, a touch sensor driving margin may decrease due to a resistance component and a capacitance component of a sensor pattern, and a touch sensitivity may decrease due to insufficient charge time that may lower a touch driving frequency and increase the size of a conductor that the touch sensor may recognize, thereby deteriorating driving of the touch sensor. To decrease the resistance component of the touch sensor, a thickness of the sensing electrode or a line width of a metal connecting part may be increased, which may deteriorate a visibility.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a touch screen panel with low resistance characteristic without degrading a visibility characteristic.

Exemplary embodiments of the present invention provide a method of manufacturing a touch screen panel with low resistance characteristic without degrading a visibility characteristic.

Additional aspects will be set forth in the detailed description which follows, and, in part, will be apparent from the disclosure, or may be learned by practice of the inventive concept.

According to exemplary embodiment of the present invention, a touch screen panel includes a substrate including an active area and a non-active area disposed at an external side of the active area, first sensing electrodes disposed in the active area, the first sensing electrodes connected to each other and extending in a first direction, first connection patterns connecting adjacent first sensing electrodes, second sensing electrodes connected to each other and extending in a second direction crossing the first direction, second connection patterns connecting adjacent second sensing electrodes, and metal mesh patterns overlapping first portions of the first or second sensing electrodes.

The first portions may include edges of the first or second sensing electrodes.

The first sensing electrodes and the second sensing electrodes may be disposed on the same layer.

The first and second sensing electrodes and the first and second connection patterns may include a transparent conductive oxide.

One of the first and second connection patterns may include a low resistance metal material.

The metal mesh pattern may include a low resistance metal material.

The low resistance metal material may include at least one of molybdenum (Mo), silver (Ag), gold (Au), titanium (Ti), copper (Cu), aluminum (Al), and a molybdenum/aluminum/molybdenum (Mo/Al/Mo) alloy.

Panel visibility or a resistance characteristic of the touch screen panel may be configured to vary according to a size of the first portions.

Panel visibility or a resistance characteristic of the touch screen panel may be configured to vary according to a density of the metal mesh patterns in the first portions.

A coupling capacitance between the first and second sensing electrodes may be configured to vary according to a shape of the first portions.

The touch screen panel may further include an interlayer insulating layer disposed between the substrate and one of the first and second sensing electrodes including the first portions, in which the interlayer insulating layer may not be disposed on the first portions.

A width of the metal mesh patterns may be less than 5 μm.

According to an exemplary embodiment of the present invention, a method of manufacturing a touch screen panel includes forming first sensing electrodes in a first direction on an active area of a substrate, forming first connection patterns in the first direction to connect the first sensing electrodes to each other, forming second sensing electrodes between the first sensing electrodes in a second direction crossing the first direction, forming second connection patterns in the second direction to connect the second sensing electrodes to each other, and forming metal mesh patterns to overlap first portions of the first sensing electrodes or the second sensing electrodes.

The first and second sensing electrodes and the first and second connection patterns may include a transparent conductive oxide.

One of the first and second connection patterns may be include a low resistance metal material.

One of the first and second connection patterns may be formed together with the metal mesh patterns at the same time, when one of the first and second connection patterns include the low resistance metal material.

Forming the metal mesh patterns may include forming the metal mesh patterns at areas corresponding to the first portions, and forming one of the first and second on the metal mesh patterns.

Forming the metal mesh patterns may include forming the metal mesh patterns on the first portions after forming the one of the first and second sensing electrodes including the metal mesh patterns.

A width of the metal mesh patterns may be less than 5 µm.

The method of manufacturing a touch screen panel may further include forming an interlayer insulating layer between the substrate and one of the first and second sensing electrodes including the first portions, in which the interlayer insulating layer may not be disposed on the first portions.

According to exemplary embodiments of the present invention, a touch screen panel includes parallel connected electrodes formed of a transparent conductive oxide and metal mesh patterns having a lower resistance than that of the touch screen panel formed of only a transparent conductive oxide partially overlaps the electrodes, to improve a resistance characteristic.

According to the exemplary embodiments of the present invention, the electrodes of the touch screen panel partially overlap the metal mesh patterns, to minimize phenomena, such as haze, metal reflection, and sparkling that may be generated in a metal mesh electrode, thereby preventing degradation of a visibility characteristic of the display panel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
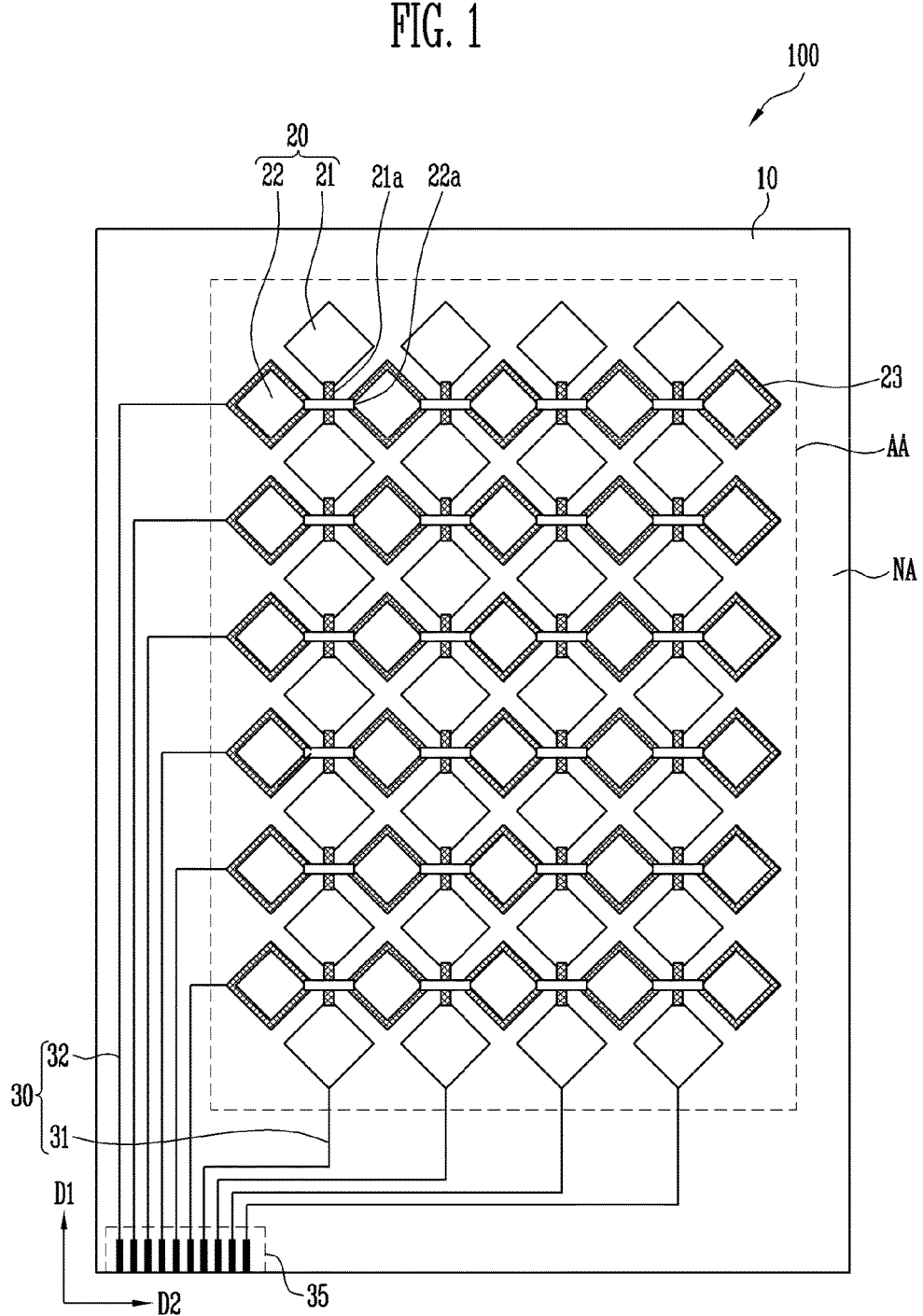
FIG. 1 is a top plan view schematically illustrating a touch screen panel according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the"

are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a top plan view schematically illustrating a touch screen panel according to an exemplary embodiment of the present invention.

Referring to FIG. 1, a touch screen panel 100 according to the present exemplary embodiment may include a substrate 10 divided into an active area AA and a non-active area NA, sensing electrodes 20 formed in the active area AA of the substrate 10, and external wires 30 formed in the non-active area NA.

The substrate 10 may be divided into the active area AA which overlaps an image display area, in which the sensing electrodes 20 for detecting a touch input are formed, and the non-active area NA positioned at an external side of the active area AA and in which the external wires 30 are formed.

The substrate 10 may be formed of a transparent material having high thermal resistance and high chemical resistance, and may have a flexible property. The substrate 10 may be a thin film substrate formed of one or more of polyethylene terephthalate (PET), polycarbonate (PC), acryl, polymethyl methacylate (PMMA), triacetyl cellulose (TAC), polyether sulfone (PES), and polyimide (PI). In addition, glass may also be utilized as the substrate 10.

An interlayer insulating layer 11 (see FIG. 3) and the like may be formed on the substrate 10 before the sensing electrodes 20 are formed. The sensing electrodes 20 may include first sensing electrodes 21 disposed in the active area AA of the substrate 10 and electrically connected to each other in a first direction D1, and second sensing electrodes 22 disposed between the first sensing electrodes 21 so as not to overlap the first sensing electrodes 21, and electrically connected to each other in a second direction D2 crossing the first direction D1.

The first sensing electrodes 21 and the second sensing electrodes 22 are alternately disposed to be connected in different directions. For example, the first sensing electrodes 21 may be formed to be connected to each other in a column direction (vertical direction) and connected with the external wires 31 in the unit of a column line, respectively, and the second sensing electrodes 22 are formed to be connected to each other in a row direction (horizontal direction) and connected with the external wires 32 in the unit of a row line, respectively.

The sensing electrodes 20 may be formed of a transparent conductive oxide, such an indium tin oxide (ITO) or indium zinc oxide (IZO) so that light of a display unit disposed at a lower side may pass through. Alternatively, the sensing electrodes 20 may also be formed of a material including silver nanowires (AgNW) with improved electrical and flexible properties.

The first sensing electrodes 21 are connected with each other by first connection patterns 21a disposed on the same row in the first direction D1 in the active area.

The first sensing electrodes 21 arranged in the first direction D1 may be electrically connected with each other and the respective second sensing electrodes 22 arranged in the second direction D2 are electrically connected with each other, so that the first sensing electrodes 21 and the second sensing electrodes 22 may be the sensing electrodes of the touch screen panel 100. Accordingly, the first sensing electrodes 21 and the second sensing electrodes 22 are connected with each other by the first connection patterns 21a and the second connection patterns 22a, respectively.

The first connection pattern 21a and the second connection pattern 22a may be formed of a transparent conductive oxide similar to the first and second sensing electrodes 21 and 22, but at least one of the connection patterns 21a or 22a may be formed of a low resistance metal material, such as molybdenum (Mo), silver (Ag), titanium (Ti), copper (Cu), aluminum (Al), or a molybdenum/aluminum/molybdenum (Mo/Al/Mo) alloy.

When one of the first connection pattern 21a and the second connection pattern 22a is formed of the metal material, the metal material may be the same material forming the external wires 30 disposed in the non-active area NA of the touch screen panel 100. Since the connection pattern formed of the metal material is formed on the same layer by the same process as that of the external wires 30, an additional mask process for forming the metal connection pattern may not required, thereby reducing the number of processes and processing time thereof.

Further, any one of the first connection pattern 21a and the second connection pattern 22a connecting the first sensing electrodes 21 and the second connection patterns 22a, respectively, may be formed by a low resistance metal, to improve a flow of charges in the connection portions of the sensing electrodes, thereby improving sensing sensitivity.

When the first sensing electrodes 21 and the second sensing electrodes 22 are formed on the same layer, the first connection patterns 21a and the second connection patterns 22a in the overlapping portions may not be formed on the same layer to prevent short-circuit, and an insulating layer may also be further formed in the overlapping portion.

According to the present exemplary embodiment, the first and second sensing electrodes 21 and 22 are formed of the same material, and disposed in diamond patterns on any one surface of the substrate 10 on the same layer. Alternatively, the materials, the shapes, and the disposition structures of the sensing electrodes 21 and 22 may vary. For example, the first and second sensing electrodes 21 and 22 may be disposed in straight stripe patterns on different layers, or alternatively, the first and second sensing electrodes 21 and 22 may be formed on both surfaces of the substrate 10, respectively, with the substrate 10 interposed therebetween.

The touch screen panel 100 according an exemplary embodiment of the present invention may include metal mesh patterns 23 having the metal mesh structure overlapping in partial areas of the sensing electrodes.

Figure 2:
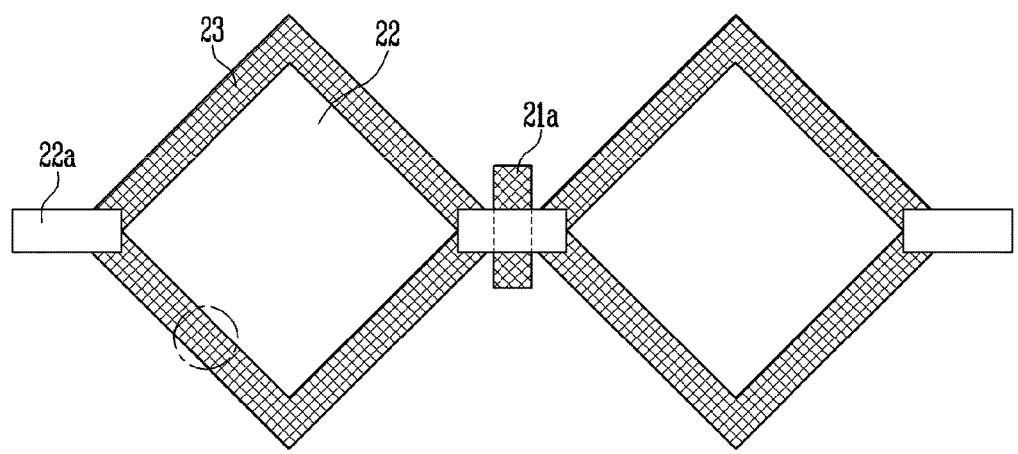
FIG. 2 is a top plan view illustrating a pair of enlarged second sensing electrodes of the touch screen panel of FIG. 1.

Referring to FIG. 2, in the touch screen panel 100 according to the present exemplary embodiment, the metal mesh patterns 23 having the metal mesh structure overlap edge areas of the second sensing electrodes 22 having a diamond shape to form a second sensing electrode column.

Figure 3:
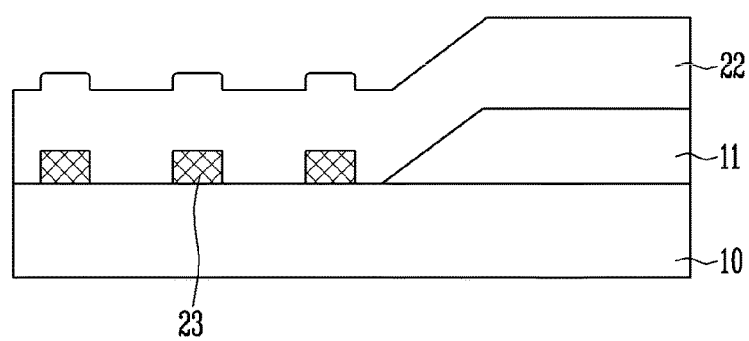
FIG. 3 is a cross-sectional view illustrating a cross-section of a part of the second sensing electrode.

FIG. 3 is a diagram illustrating a cross section of a circular portion in the second sensing electrode 22 illustrated in FIG. 2, of which the edge overlaps the metal mesh pattern 23. Referring to FIG. 3, the interlayer insulating layer 11 is formed at a center portion of the substrate 10 in which the second sensing electrodes 22 are formed, and the metal mesh pattern 23 is formed at the edge portion in which the second sensing electrode 22 is formed. The second sensing electrode 22 is formed to cover the interlayer insulating layer 11 and the metal mesh pattern 23.

As illustrated in FIG. 3, the metal mesh pattern 23 overlaps the edge of the second sensing electrode 22. According to an exemplary embodiment of the present invention, the metal mesh pattern 23 may overlap the edge of the first sensing electrode 21 or all edges of the first sensing electrode 21 and the second sensing electrode 22, and a position, size, and shape of the metal mesh pattern 23 may be varied considering resistance and visibility.

The metal mesh pattern 23 may be formed under the edge of the second sensing electrode 22. Alternatively, the metal mesh pattern 23 may be formed on the edge of the second sensing electrode 22. The metal mesh pattern 23 may be formed of a low resistance metal material used in the first connection pattern 21a, such as molybdenum (Mo), silver (Ag), titanium (Ti), copper (Cu), aluminum (Al), or a molybdenum/aluminum/molybdenum (Mo/Al/Mo) alloy.

When the metal mesh pattern 23 includes a metal material forming the connection patterns 21a or 22a, the metal mesh pattern 23 may be formed during the same process of forming the connection patterns 21a or 22a that includes the same metal material.

Controlling a size, density, and form of the metal mesh pattern 23 may adjust a resistance characteristic and visibility of the touch screen panel 100.

Figure 4:
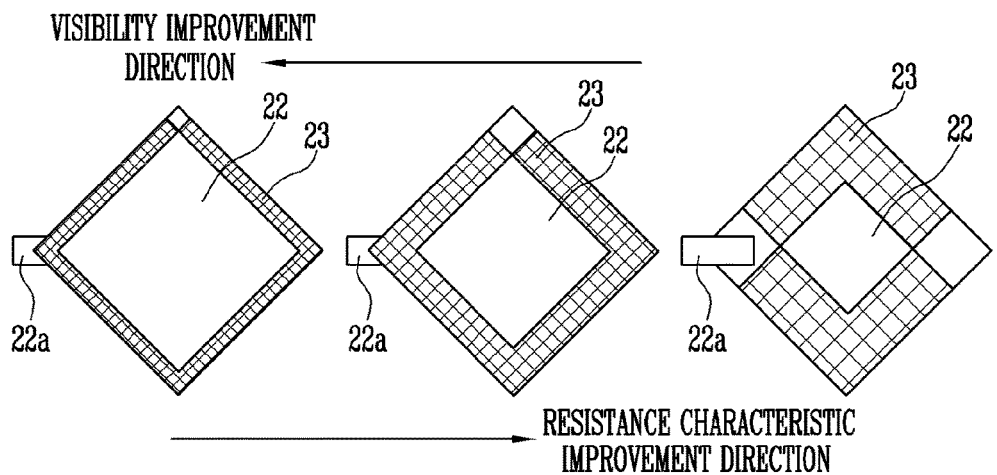
FIG. 4, FIG. 5, and FIG. 6 are diagrams illustrating the sensing electrodes having different sizes, densities, and shapes of the metal mesh pattern, according to exemplary embodiments of the present invention.
Figure 5:
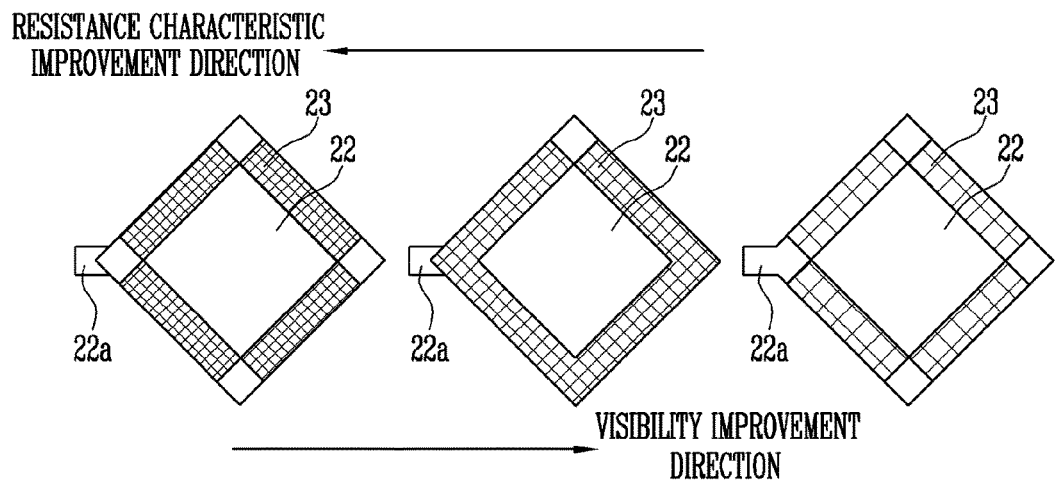
Figure 6:
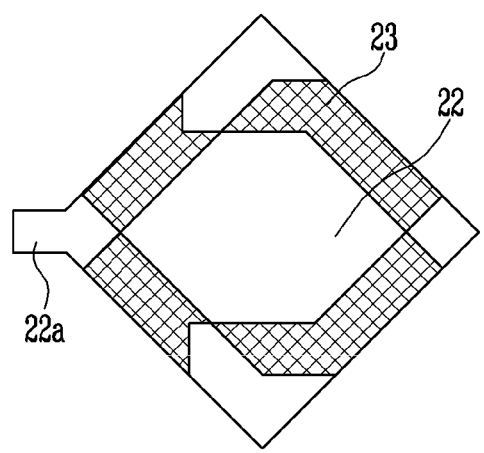

FIG. 4 is a diagram illustrating a change in a resistance characteristic and visibility according to a width of the meal mesh pattern, FIG. 5 is a diagram illustrating a change in a resistance characteristic and visibility according to a density of the meal mesh pattern, and FIG. 6 is a diagram illustrating a form of a meal mesh pattern according to an exemplary embodiment of the present invention.

Referring to FIG. 4, in the touch screen panel 100 according to an exemplary embodiment of the present invention, when the metal mesh patterns 23 overlap the edges of the diamond-shaped second sensing electrode 22 forming the second sensing electrode column, visibility may be improved when the metal mesh pattern 23 is formed to have a small width, and a resistance characteristic may be improved when the metal mesh pattern 23 is formed to have a large width. Accordingly, the width of the metal mesh pattern 23 may be formed to be approximately 5 82 m or less.

Referring to FIG. 5, in the touch screen panel 100 according to an exemplary embodiment of the present invention, when the metal mesh patterns 23 overlap the edges of the diamond-shaped second sensing electrode 22 forming the second sensing electrode column, a resistance characteristic may be improved when the metal mesh pattern 23 is formed to have a high density, and visibility may be improved when the metal mesh pattern 23 is formed to have a small density. Accordingly, a resistance characteristic of the touch screen panel 100 may be controlled by controlling a density of the metal mesh pattern 23.

Referring to FIG. 6, in the touch screen panel 100 according to an exemplary embodiment of the present invention, when the metal mesh patterns 23 having the metal mesh structure overlap the edges of the diamond-shaped second sensing electrode 22 forming the second sensing electrode column, a touch sensor function may be adjusted by adjusting the shape of the metal mesh pattern 23. When the meal mesh pattern 23 is formed in the shape as illustrated in FIG. 6, a resistance characteristic in a signal direction may be improved while decreasing a coupling capacitance between the first sensing electrode 21 and the second sensing electrode 22.

Referring back to FIG. 1, the external wires 30 are disposed in the non-active area NA of the touch screen panel 100, which is the external side of the active area AA that displays an image, to supply signals detected by the sensing electrodes 21 and 22 to an external driving circuit (not illustrated) through the pad part 35.

The first sensing electrodes 21 are electrically connected with the external wires 31 connected in a line unit in the first direction, respectively. The second sensing electrodes 22 are electrically connected with the external wires 32 connected in a line unit in the second direction, respectively. The external wires 30 may be formed of a low resistance metal material, such as molybdenum (Mo), silver (Ag), titanium (Ti), copper (Cu), aluminum (Al), or a molybdenum/aluminum/molybdenum (Mo/Al/Mo) alloy, or a transparent electrode material.

When an object, such as a hand of a person or a stylus pen, contacts the capacitive touch screen panel, the touch screen panel 100 transmits a change in capacitance according to a contact position to the external driving circuit (not illustrated) from the first and second sensing electrodes 21 and 22 through the external wires 31 and 32 and the pad part 35. The change in the capacitance is converted into an electrical signal by an X and Y input processing circuit (not illustrated), so that the contact position is recognized.

The first sensing electrodes 21 and the second sensing electrodes 22 may be disposed on the same layer or on different layers. As illustrated in FIG. 3, the interlayer insulating layer 11 may be formed on the substrate, and a passivation layer (not illustrated) may be formed on the first and second sensing electrodes 21 and 22 to protect one of the first and second sensing electrodes 21 and 22 disposed at a lower side thereof. The interlayer insulating layer 11 and the passivation layer may include a transparent insulating material, such as a silicon oxide layer ($SiO_2$).

The touch screen panel 100 according to an exemplary embodiment of the present invention may be formed on an independent substrate and be attached onto an upper surface of a display panel and the like, or be integrated with the display panel. More particularly, the touch screen panel 100 may be integrated with the display panel by directly forming the first sensing electrodes 21 and the second sensing electrodes 22, which are disposed on the display panel to receive a touch input, on an upper substrate of the display panel.

Figure 7A:
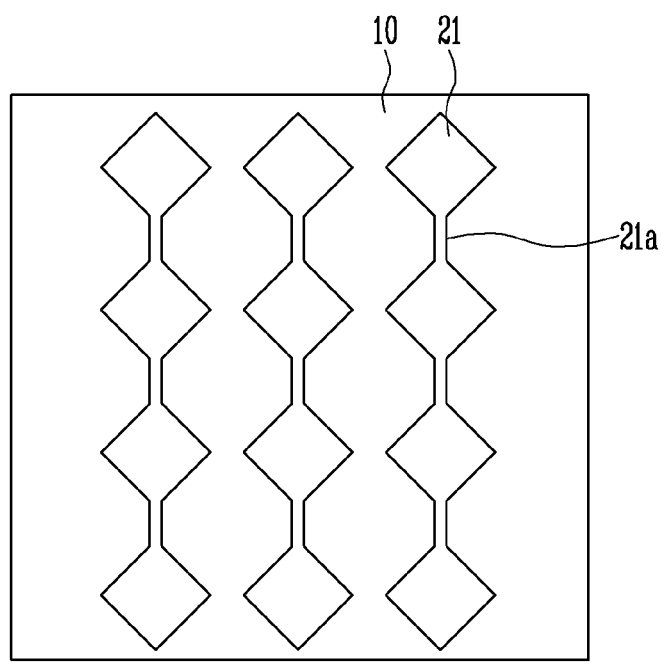
FIG. 7A, FIG. 7B, and FIG. 7C are process diagrams illustrating a process of manufacturing a touch screen panel according to an exemplary embodiment of the present invention.
Figure 7B:
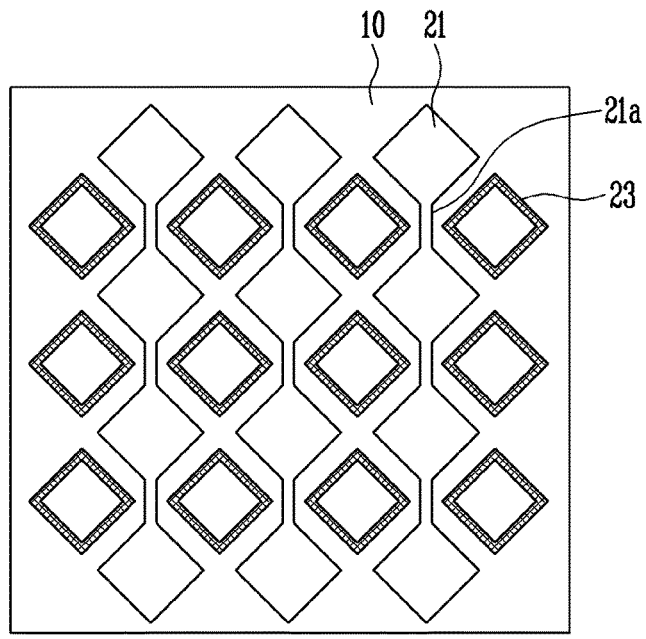
Figure 7C:
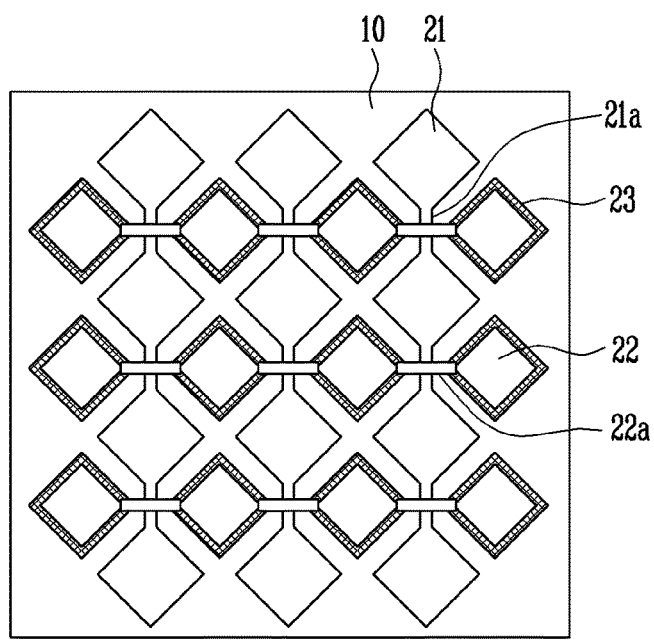

FIGS. 7A to 7C illustrate a method of manufacturing a touch screen panel.

Referring to FIG. 7A, in the first operation, a layer formed of a transparent conductive oxide, such as an ITO, is disposed on the substrate 10. The first sensing electrodes 21 and the first connection patterns 21a are formed by patterning the transparent conductive oxide. For example, a photolithography process and an etching process may be performed on the ITO layer by using a mask (not illustrated) having patterns corresponding to the first sensing electrodes 21 and the first connection patterns 21.

Referring to FIG. 7B, in the second operation, the metal mesh patterns 23 are formed on the substrate 10, to correspond to edge portions of areas on which the second sensing electrodes 22 are to be formed. The metal mesh patterns 23 may be formed by conventional method, such as forming a metal mesh layer and forming the metal mesh patterns 23 a photolithography process and an etching process by using a mask corresponding to the metal mesh pattern 23.

Referring to FIG. 7C, in the third operation, a layer formed of a transparent conductive oxide, such as ITO, is formed on the substrate 10 on which the metal mesh patterns 23 are formed, and the second sensing electrodes 22 and the second connection patterns 22a are formed by patterning the transparent conductive oxide. For example, the photolithography process and the etching process may be performed on the ITO layer by using a mask (not illustrated) having patterns corresponding to the second sensing electrodes 22 and the second connection patterns 21.

The second operation and the third operation may be performed in a reverse order. More particularly, the metal mesh patterns 23 may be formed in the edge portions of the second sensing electrodes 22 after the second sensing electrodes 22 and the second connection patterns 21 are formed on the substrate 10.

When the first connection patterns 21a and the metal mesh pattern 23 includes a metal material, rather than ITO, the number of masks may be decreased by forming the first connection patterns 21a together with the metal mesh patterns 23, instead of forming the first connection patterns 21a together with the first sensing electrodes 21.

When the first sensing electrodes 21, the second sensing electrodes 22, the first connection patterns 21a, and the second connection patterns 22a are formed of the same material, the photolithography process and the etching process may be performed by using one mask having patterns corresponding to the first sensing electrodes 21, the second sensing electrodes 22, the first connection patterns 21a, and the second connection patterns 22a.

When the metal mesh patterns 23, the first connection patterns 21a, and the external wires 31 and 32 are formed of the same material, forming the metal mesh patterns 23 and the first connection patterns 21a in the active area AA and forming the external wires 31 and 32 in the non-active area NA may be implemented simultaneously by forming the metal layer and patterning the metal layer.

Further, although not illustrated, the interlayer insulating layer 11 may be formed by forming an insulating layer including an organic or inorganic insulating material on the substrate 10 and patterning the insulating layer before forming the first sensing electrodes 21 and the second sensing electrodes 22.

The first connection patterns 21a and the second connection patterns 22a may not be formed on the same layer to prevent short-circuit between overlapping portions of the first connection patterns 21a and the second connection patterns, and an insulating layer may be formed in the overlapping portion.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch screen panel, comprising:
    a substrate comprising an active area and a non-active area disposed at an external side of the active area;
    first sensing electrodes disposed in the active area, the first sensing electrodes connected to each other and extending in a first direction;
    first connection patterns connecting adjacent first sensing electrodes;
    second sensing electrodes connected to each other and extending in a second direction crossing the first direction;
    second connection patterns connecting adjacent second sensing electrodes; and
    metal mesh patterns disposed on the substrate,
    wherein:
    the first and second sensing electrodes each have a central portion and an edge portion surrounding the central portion; and
    the metal mesh patterns overlap, within the first or second sensing electrodes, only the edge portions of the first or second sensing electrodes.

2. The touch screen panel of claim 1, wherein the first sensing electrodes and the second sensing electrodes are disposed on the same layer.

3. The touch screen panel of claim 1, wherein the first and second sensing electrodes and the first and second connection patterns comprise a transparent conductive oxide.

4. The touch screen panel of claim 1, wherein one of the first and second connection patterns comprise a low resistance metal material.

5. The touch screen panel of claim 1, wherein the metal mesh patterns comprise a low resistance metal material.

6. The touch screen panel of claim 4, wherein the low resistance metal material comprises at least one of molybdenum (Mo), silver (Ag), gold (Au), titanium (Ti), copper (Cu), aluminum (Al), and a molybdenum/aluminum/molybdenum (Mo/Al/Mo) alloy.

7. The touch screen panel of claim 1, wherein panel visibility or a resistance characteristic of the touch screen panel is configured to vary according to a size of the edge portions.

8. The touch screen panel of claim 1, wherein panel visibility or a resistance characteristic of the touch screen panel is configured to vary according to a density of the metal mesh patterns in the edge portions.

9. The touch screen panel of claim 1, wherein a coupling capacitance between the first and second sensing electrodes is configured to vary according to a shape of the edge portions.

10. The touch screen panel of claim 1, wherein a width of the metal mesh patterns is less than 5 μm.

11. The touch screen panel of claim 1, further comprising an interlayer insulating layer disposed between the substrate and one of the first and second sensing electrodes and overlapping only the central portion of the one of the first and second sensing electrodes.

12. A method of manufacturing a touch screen panel, the method comprising:
forming first sensing electrodes in a first direction on an active area of a substrate;
forming first connection patterns in the first direction to connect the first sensing electrodes to each other;
forming second sensing electrodes between the first sensing electrodes in a second direction crossing the first direction;
forming second connection patterns in the second direction to connect the second sensing electrodes to each other; and
forming metal mesh patterns on the substrate,
wherein:
the first and second sensing electrodes each has a central portion and an edge portion surrounding the central portion; and
the metal mesh patterns overlap, within the first or second sensing electrodes, only the edge portions of the first sensing electrodes or the second sensing electrodes.

13. The method of claim 12, wherein the first and second sensing electrodes and the first and second connection patterns comprise a transparent conductive oxide.

14. The method of claim 12, wherein one of the first and second connection patterns comprise a low resistance metal material.

15. The method of claim 14, wherein one of the first and second connection patterns are formed together with the metal mesh patterns at the same time, when one of the first and second connection patterns comprise the low resistance metal material.

16. The method of claim 12, wherein one of the first and second sensing electrodes covers the metal mesh patterns.

17. The method of claim 12, wherein forming the metal mesh patterns comprises:
forming the metal mesh patterns on the edge portions after forming the one of the first and second sensing electrodes.

18. The method of claim 12, further comprising forming an interlayer insulating layer between the substrate and one of the first and second sensing electrodes comprising the first portions,
wherein the interlayer insulating layer is not disposed on the first portions.

19. The method of claim 12, wherein a width of the metal mesh patterns is less than 5 μm.

* * * * *